United States Patent
Frost

(10) Patent No.: US 6,753,914 B1
(45) Date of Patent: Jun. 22, 2004

(54) IMAGE CORRECTION ARRANGEMENT

(75) Inventor: Dane Roy Frost, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/370,007

(22) Filed: Aug. 6, 1999

Related U.S. Application Data

(60) Provisional application No. 60/135,897, filed on May 26, 1999.

(51) Int. Cl.[7] .................................................. H04N 9/64
(52) U.S. Cl. ........................................ 348/246; 358/474
(58) Field of Search ................................ 348/241, 246, 348/247, 248, 249, 250, 251, 243, 607, 615, 618, 619, 175, 264, 254; 358/474, 482, 483, 518, 504; 382/274

(56) References Cited

U.S. PATENT DOCUMENTS

| 5,014,328 A | * | 5/1991 | Rudak ........................... 382/17 |
| 5,452,112 A | * | 9/1995 | Wan et al. .................... 358/504 |
| 5,485,289 A | | 1/1996 | Curry ........................... 358/448 |
| 5,539,866 A | | 7/1996 | Banton et al. ............... 395/117 |
| 5,579,445 A | | 11/1996 | Loce et al. .................. 395/102 |
| 5,600,574 A | | 2/1997 | Reitan ......................... 364/552 |
| 5,649,073 A | * | 7/1997 | Knox et al. .................. 395/109 |
| 5,689,343 A | | 11/1997 | Loce et al. .................. 358/298 |
| 5,764,386 A | * | 6/1998 | Robinson ..................... 358/504 |
| 5,850,472 A | * | 12/1998 | Alston et al. ................ 382/162 |
| 6,038,038 A | * | 3/2000 | Selby et al. ................. 358/446 |
| 6,292,535 B1 | * | 9/2001 | Williams et al. ........... 378/98.8 |
| 6,400,468 B1 | * | 6/2002 | Rao et al. ................... 358/1.9 |
| 6,522,355 B1 | * | 2/2003 | Hynecek et al. ............ 348/245 |

* cited by examiner

Primary Examiner—Ngoc-Yen Vu
Assistant Examiner—Rashawn N. Tillery
(74) Attorney, Agent, or Firm—Perkins Smith & Cohen LLP; Jacob N. Erlich; Orlando Lopez

(57) ABSTRACT

An imaging system (10) for producing image-representative signals representing information-bearing objects (30) includes a line imager (12) and an arrangement (32) for scanning (34) the object (30) so that image-representative signals are generated. A correction-signal generating arrangement (22) is used in a normalization mode (300) in which, with a white calibration object, each pixel (p1, p2, . . . , p2N) is averaged (A) over the width or length of the object (30). A correction factor is obtained by comparing the averaged value of the pixel over the white object with an ideal value. The correction factor (a) may be multiplicative, in which case it is the factor required to bring the average value to the ideal value, or (b) it may be additive, in which case it is the difference between the average value for that pixel and the ideal value. After the normalization or calibration, the processor (or firm- or hardware) processes each pixel of the information-bearing scans by applying the correction factor to produce corrected image-representative signals. The corrected signals may be used by conventional information-extraction techniques, such as optical character recognition.

5 Claims, 5 Drawing Sheets

IMAGE CORRECTION ARRANGEMENT

This application claims priority from Provisional patent application Serial No. 60/135,897 filed May 26, 1999.

FIELD OF THE INVENTION

This invention relates to compensating for image distortion on a pixel by pixel basis for the purpose of improving the quality of images captured by CCD camera systems.

BACKGROUND OF THE INVENTION

Modern mail-handling procedures are becoming more sophisticated, and include such improvements as automated optical character (address) reading, and automated sorting and routing based on the results of such reading. A necessary aspect of such systems is the camera subsystem by which the address portion of each piece of mail is imaged for further processing. It has been found that line-array charge-coupled device (CCD) imagers, coupled with devices for scanning each mail piece before (in front of) the CCD array, are more effective than area-scanned imaging arrays. Such line scan arrays when combined with a scanning arrangement are known as scanners.

Objects or scenes scanned using digital CCD cameras exhibit some level of distortion attributable to irregularities in lighting and in the line array itself. This distortion is manifested as a distorted background over which the object information is superposed. The object information includes details which may be important to subsequent processing. The imperfections of the background of the image of the object may adversely affect that subsequent processing of the image. The imperfections of such cameras are important in the field of mail handling, and more generally in the fields of image information processing and optical character recognition.

Improved digital camera systems are desired.

SUMMARY OF THE INVENTION

An imaging system or camera according to an aspect of the invention includes a line discrete-pixel array, including a array of light-sensitive pixel sensors, for absorbing light during an interval and producing analog electrical signals in response to the absorbed light, and for transferring the signals to an output port. The resulting signals are representative of an image. The imaging system also includes an arrangement for illuminating an object to be imaged, and for causing illumination of the object to excite the array. This arrangement may include a light source directed toward the object, and an optical system associated with the imager for casting an image of a portion of the object onto the CCD line array. The image resulting from the image-representative signals may be subject to distortion arising from at least one of (a) pixel-to-pixel variations in sensitivity of the array, (b) image illumination variations, (c) channel errors in multichannel arrays, and (d) other sources, which result in distortion of an image generated from the signals. An arrangement is provided for scanning the object relative to the array, so as to produce a sequence of uncorrected signals associated with each pixel of the array across the scanned object. The scanning provides relative motion, so either the line array, the object, or both may be moved. A color-scale correction arrangement is coupled to the array, for receiving the uncorrected signals, and for correcting the signal representing each uncorrected pixel by a correction factor. In the case of a monochrome or black-and-white line array, the color-scale correction is a grey-scale correction. The correction factor is established or determined by a procedure including the steps of (a) with a particular color object (a white object in the case of a monochrome line array) before the array, averaging the values of the uncorrected signal for each of the pixels of the array over at least a portion of the scanned object, to thereby produce averaged uncorrected signals for each pixel of the line array, (b) for each of the pixels of the line array, determining an ideal averaged uncorrected signal value produced by an ideal pixel of an ideal imager. The correction factor which is applied to the signal from each pixel of the line array during normal operation is the factor required to bring the averaged uncorrected signal value to the ideal signal value. In a first type of correction, the correction factor is multiplied by the uncorrected signal from the pixel. In a second type of correction, the correction factor is added to the uncorrected signal from the pixel.

In a particularly advantageous embodiment of the invention, the imaging system further includes a threshold arrangement coupled to the color-scale correction arrangement or grey-scale correction arrangement, for enabling the color-scale correction arrangement when the uncorrected signal value for a particular pixel represents a color scale value or grey-scale value having a value lying on a first side of a threshold value, where the threshold value lies between black level and the ideal averaged uncorrected signal value for the particular color. Thus, in one embodiment, the correction of the signal from a pixel is not performed for that pixel if the signal level at the moment in question represents a value darker than the threshold value, whereas the correction is performed (by multiplication by, or addition of, the correction factor) if the signal value represents a grey or color value on the light or white side of the threshold.

A method according to another aspect of the invention, for correcting the signals produced by each pixel of a line-scan imager array, includes the set-up steps and normal-operation steps. The set-up steps include the step of scanning a white object or calibration target before (in front of) a line-scan array, to thereby produce, for each pixel of the array, a sequence of raw signals representing a portion of the object. The set-up further includes the step of averaging the values of the sequence of raw signals of each of the pixels across at least a portion of the object, to thereby produce an average value for each of the pixels, followed by determining, for each the pixel of the line array, one of (a) a multiplicative and (b) an additive correction factor which, when applied to the average value of the signal, results in a predetermined ideal value of the signal. Following the set-up steps, the method includes the normal-operation steps of, scanning an information-carrying object before the line-scan array, to thereby produce raw signals from each pixel of the line-scan array, and correcting the raw signals by one of (a) multiplying the raw signal from each pixel by the multiplicative correction factor and (b) adding to the raw signal from each pixel the additive correction factor, to thereby produce corrected signals for each of the pixel of the line-scan array. Following correction of the normal-operation signals, the corrected signals are processed to extract information therefrom, as by optical character recognition processes.

In an alternative mode of the method, an object of a uniform color is substituted for the white object.

DESCRIPTION OF THE INVENTION

Figure 1:
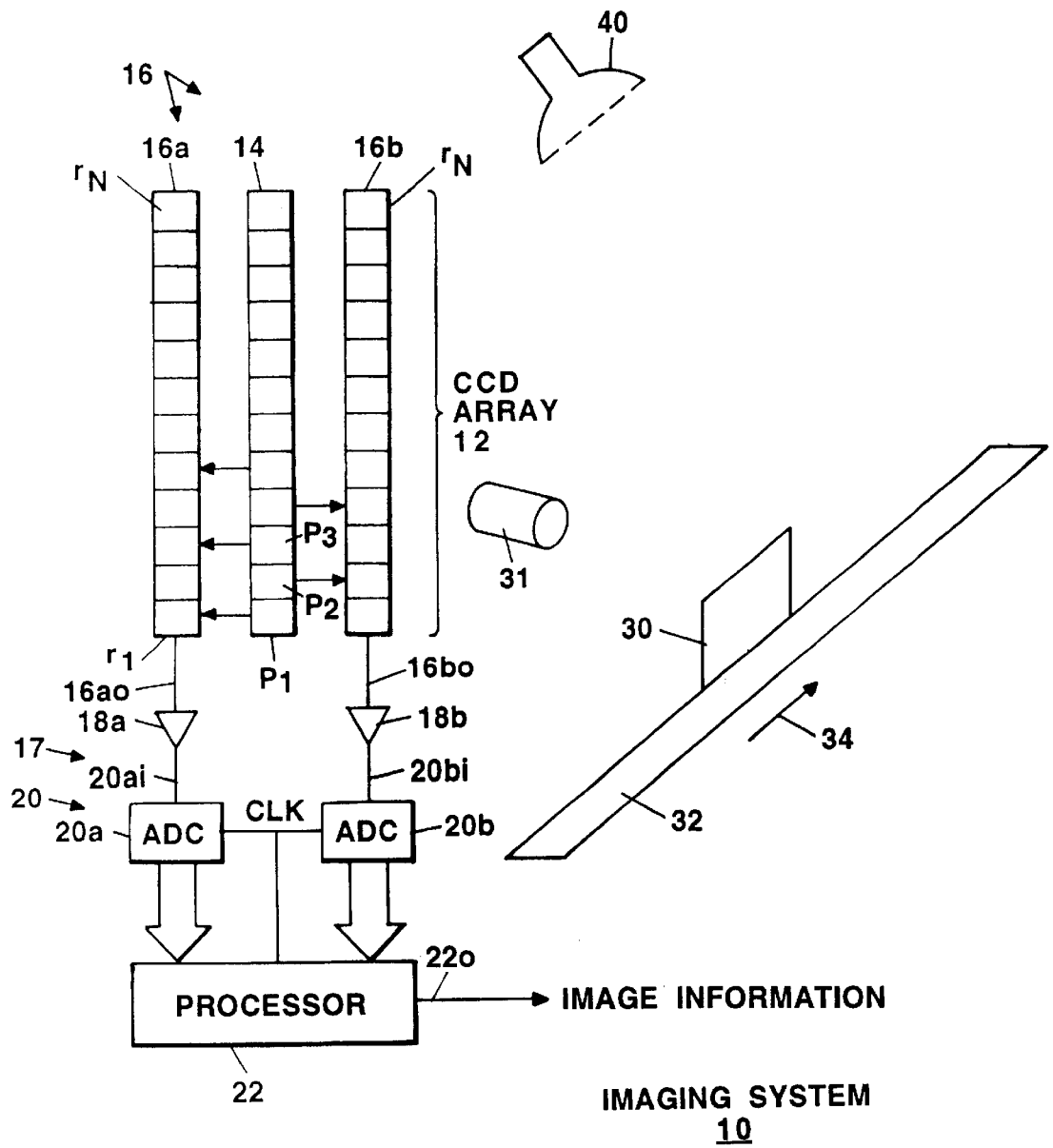
FIG. 1 is a simplified block diagram of an imaging system in accordance with an aspect of the invention.

FIG. 1 is a simplified block diagram of an imaging system in accordance with an aspect of the invention. In FIG. 1, an imaging system 10 includes a line charge-coupled device (CCD) array (line-scan array) designated generally as 12. As illustrated, array 12 includes a vertical line array 14 of light-sensitive pixels, together with a set 16 of registers including first and second registers 16a and 16b, respectively. The light-sensitive pixels of the line array 14 are designated p1, p2, p3, . . . , $P_{2N}$, and the registers 16a, 16b each include register elements r1 through $r_N$. In a particular embodiment of the invention, the vertical line array of light-sensitive pixels contains 4096 such pixels, including pixels p1, p2, p3, . . . , p4096, and there are four registers instead of the two as illustrated; each of the four registers consequently has 1024 elements. In the embodiment of FIG. 1, semi-adjacent pixels of the line array 14 are connected to like elements or pixels of the registers 16a and 16b. For example, the light-sensitive pixel designated p1 in FIG. 1 is connected to register 16a, the second pixel, designated p2, is connected to register 16b, and the third pixel, designated p3, is connected to register 16a. In general for a dual channel camera, every odd-numbered pixel is connected to register 16a, and every even-numbered pixel is connected to register 16b. Another way of looking at it is that every other pixel is connected to a first channel associated with register 16a, and the other pixels are associated with a second channel, which is associated with register 16b. In an embodiment (not illustrated) with four registers, every fourth pixel of the line array 14 of light-sensitive pixels would be connected to the same one of four channel.

The light-sensitive portion 14 of line-array camera 12 of FIG. 1 integrates electrical charge in response to light focussed onto the array for a period of time established by a clock (source not illustrated). The integrated charge of each pixel is an analog or analogue signal which ideally represents the amount of light which fell onto the particular pixel during the integration period, but which in practice is subject to errors such as dark current, which is charge which accumulates in the light-sensitive pixels of the vertical line array 14 in the absence of applied light.

The reason for having more registers, such as 16a and 16b of FIG. 1, than there are line arrays 14, is to allow operation at a higher frame rate. More particularly, reading of the signal from a register requires sequential transfer of the charge in each element of the register to the next adjacent element, as many times as may be required in order to move the charge representing the signal of the most remote register element to the output port. Thus, transfer of signal from register element $r_N$ of register 16a requires N (or a multiple thereof) clock cycles. If the number of register elements is doubled, the time required to read out the signal is doubled, which reduces the attainable frame rate. Thus, increasing the number of registers 16 reduces the readout time, and increases the attainable frame rate, all other things being equal.

As also illustrated in FIG. 1, the time-quantized analog signal samples (one signal for each clock cycle or multiple thereof) produced at output port (output) 16ao of register 16a are read or coupled to an amplifier 18a of a set 18 of amplifiers, and the corresponding signal generated at output port 16bo of register 16b is read to an amplifier 18b. The amplified signal produced at the output of amplifier 18a is applied to the input port (input) 20ai of an analog-to-digital converter (ADC) 20a of a set 20 of analog-to-digital converters, and the amplified output of amplifier 18b is applied to the input 20bi of an ADC 20b. The analog-to-digital converters 20a, 20b convert their amplified time-quantized analog input signals into parallel digital (time- and amplitude-quantized) form. The resulting parallel digital signals are applied to a processor designated 22. In a preferred embodiment of the invention, line array 14, register set 16, amplifier set 18, and ADC set 20 are all integrated onto one semiconductor chip or chipset. Processor 22 processes the digital signals in accordance with an aspect of the invention, and produces image information on a signal path 24. This signal information may be further processed in ways well known in the art, as for example by optical character recognition.

Imager 10 of FIG. 1 also includes an object 30 being imaged by camera 12. In the particular embodiment under discussion, the object 30 is a piece of mail, as for example a letter. Object 30 is illuminated by a light source illustrated as 40. Mailpiece 30 is carried by a conveyor or handler 32 in the direction of arrow 34 relative to camera 12. Camera 12 is associated with an imaging system illustrated as 13, such as a lens system, arranged to image a vertical "slice" of the image onto vertical line array 14. The rapidity of motion of the mailpiece 30 in direction 34 is selected in conjunction with the frame rate of vertical line array 14 so that signals are produced at the output ports of the ADCs of set 20 of ADCs, which together represent an area scan of a surface of mailpiece 30, as known in the art.

Solid-state CCD cameras, such as camera 12 of FIG. 1, are subject to various forms of distortion, as mentioned above. The distortion is such that it is desirable to provide compensation or correction therefor, in order to enhance the accuracy or reliability of the signal processing steps following the generation of image-representative signals. In addition to pixel-to-pixel variations in dark current and sensitivity of the light-sensitive pixels of line array 14, there may be differences in the transfer efficiency as between the registers of set 16 of registers, which in the representation of FIG. 1 is manifested as a difference between the transfer efficiencies of registers 16a and 16b. Such a difference might be manifest as a somewhat different (higher or lower) signal level at the output 16bo of register 16b by comparison with the output signal level at output 16ao of register 16a. It should be noted that a signal representing a great deal of integrated light will normally be generated as a negative-polarity signal voltage, and black level (no light) will be near zero signal voltage. Thus, with a perfectly white object being imaged, the average signal level produced at the output port 16*ao* may be different from the output signal level produced at output port 16*bo*, and the individual pixel signal values themselves may differ from one to the other. This difference in efficiency of the registers would, taken alone, tend to produce a difference in grey level between every other pixel in the image.

Even if the output signals at ports 16*ao* and 16*bo* of registers 16*a* and 16*b*, respectively, were the same, differences between the amplification gain of amplifiers 18*a* and 18*b* might result in systematic differences between the signal sets in the channels. Similarly, it is difficult to make ADCs such as the ADCs of set 20 of FIG. 1 track perfectly. As a result of all of these channel-to-channel differences, and further as a result of unavoidable differences in illumination intensity across the object, the signal value represented by a particular pixel signal may be different across the line array 14. In addition to channel-to-channel differences, each register may produce pixel-to-pixel differences attributable to transfer efficiencies. Also, as mentioned, the pixels p of light-sensitive line array 14 may have different light-to-signal transfer efficiencies. These errors or this distortion may be manifested, in the case of a monochrome (black-and-white) camera 12, as bands or regions extending across the two-dimensional or scanned image, which have grey scale variations. In other words, the image will tend to contain bands of various different levels of grey, on which the image information is superposed. If one considers the nature of the distortion on a sheet printed by xerographic methods, the text would be superposed on horizontal stripes or regions of various shades of grey. Such grey-scale variations tend to obscure the desired information, and tends to reduce the reliability of later stages of signal processing.

According to an aspect of the invention, processor 22 of FIG. 1 performs processing to ameliorate the effects of some of the distortion, to thereby produce at its output port 22*o* image-representative signal in which the effects of distortion are reduced. In order to perform its corrections, processor 22 must "know" what the distortions are. According to an aspect of the invention, the imager 10 is calibrated, before regular or normal use, by using an all-white object or calibration target 30. It must be recognized that even a piece of white paper may have variations in brightness across its surface, and that such variations in whiteness co-act with variations in illumination, and may exacerbate the variations in signal level produced by camera 12.

In some ways, color cameras are similar to monochrome cameras, which are actually panchromatic (responsive to all colors). More particularly, a color-responsive camera may be made or formed by use of a panchromatic camera in conjunction with an optical color filter, which limits the range or band of light wavelengths which can reach the camera. Thus, a monochrome camera viewing a white object will produce the same general level of output signal as a color camera viewing a correspondingly luminous colored object, but unavoidable attenuation of light by the filter may reduce the actual signal level which such a color camera produces if the overall illumination level of the object or scene being imaged is not increased.

Figure 2A:
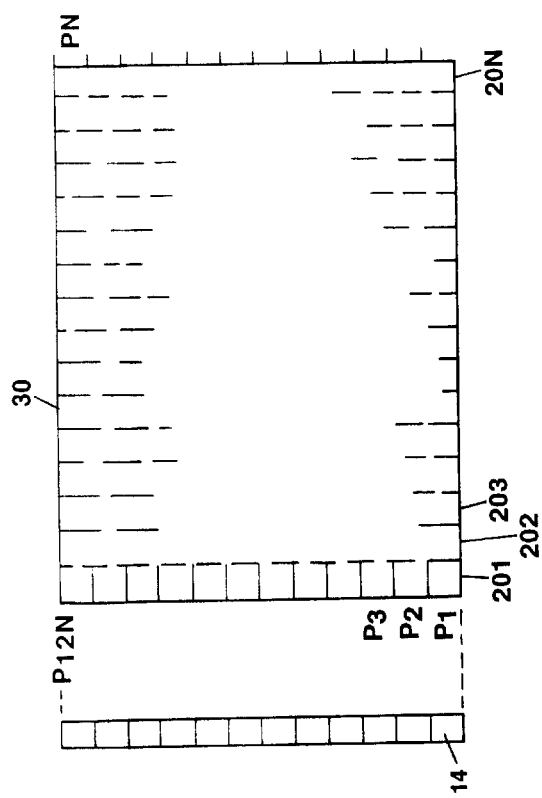
FIG. 2a is a simplified conceptual representation of a line array imager, and the locations of the various imaged regions during scanning of a rectangular object or mailpiece.

During calibration of the system of FIG. 1, an all-white (or all-one-color) object is scanned, and the monochrome (or color) camera 12 is operated. Processor 22 is set to a calibration mode, in which the output signal value of each pixel is averaged across the scan of the object. FIG. 2*a* represents the line array 14, together with a plurality of vertical scans or scanned regions of an object 30 having the form of a white rectangle. At the first instant of the motion of the object 30 as it is scanned across the image plane of the vertical line array 14, an image is formed of the region or portion of object 30 designated 201. A moment later, motion of the object 30 has brought the region designated 202 into view of the line array 14, and an image is formed of the portion 202 of object 30. In the time after the time at which portion 201 of the image is scanned by the line array and the later time at which portion 202 is imaged, the image generated by line array 14 in response to the scanning of region 201 is transferred to the adjacent register set 16, and the registers are read to produce the signals representative of region 201 of the object 30. While the registers 16 are read, motion of object 30 continues, bringing vertical slice or region 202 under line array 14, for forming an image of portion 202. Similarly, motion of the object 30 continues, and CCD array 12 forms an image of slice 203 during the time in which the information relating to the image of slice 202 is read from registers 16*a* and 16*b*. Thus, in the interim between formation of the images of portions 202 and 203, the signals representing the image of portion 202 are read from the registers of set 16. This process of motion of the object, and generation of an image of a vertical slice of the object, continues, until the last vertical slice of the object, designated 20N, is completed, and the image-representative signals are coupled to processor 22 of FIG. 1.

If the brightness of the object 30 of FIG. 1 were perfectly uniform, the illumination produced by source 40, and the electronics associated with camera 12 were also perfect, the digitized signals produced for each pixel of each vertical-scan image of FIG. 2*a* would have a uniform value, which would be the largest value possible for the number of bits of quantization. For example, in an eight-bit system, the largest number which can be represented is $2^8$, or 255. However, due to the pixel-to-pixel variation of pixel response, illumination, amplification, and channel-to-channel variation in transfer efficiency, none of the signals in any one vertical line scan is likely to reach the highest possible value of 255, and there will be a distribution of values about some lesser value. Variations in the brightness of the object will result in additional variations in the horizontal direction.

According to an aspect of the invention, processor 22 of FIG. 1 receives the raw or uncorrected signals from the ADCs of set 20, and processes the signals with a "white" object or calibration target (which may, as discussed above, instead be an object with a uniform color other than white in the case of a color camera), to produce correction factors for each pixel. When an ordinary target object having information to be extracted, such as a letter having a written address, is scanned, the correction factors which were determined with a "white" card or target are applied to the pixels, to compensate for the various sources of distortion.

Figure 2B:
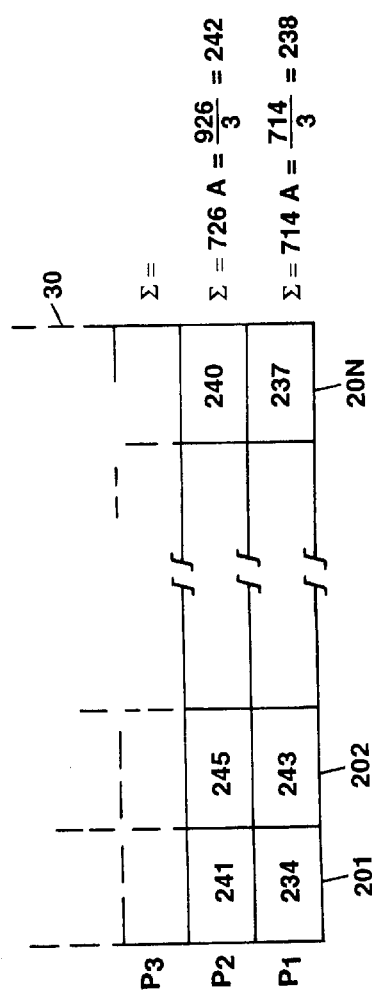
FIG. 2b is a representation of portions of the imaged regions of the object of FIG. 2a, illustrating possible image values which may be associated with various pixels of the imaged regions.

More particularly, once the white or reference object is scanned, and the resulting signals are available to processor 22, the processor performs summing across the scanned object for each separate vertical-direction pixel. This may be better understood by referring to FIG. 2*b*, which represents details of a portion of the scanned object of FIG. 2*a*. In FIG. 2*b*, pixel p1 of vertical line scan 201 is illustrated as having a representative digitized value, in an 8-bit system, of 234 units. Similarly, pixel p1 in the second vertical line scan 202 has a value of 243 units, . . . , and the first pixel p1 in the last vertical line scan 20N has a value of 237. Pixel p2 of the first vertical line scan 201 is illustrated as having a digitized value of 241 units, pixel p2 of line scan 202 has a value of 245 units, . . . , and pixel p2 of last line scan 20N has a value of 240 units. In general, processor 22 of FIG. 1 sums the values for each pixel across the total number of vertical scans. Processor 22 performs a sum for all of the p1 values across the entire object scan, from vertical scan 201 to scan 20N, as illustrated in FIG. 2b. The sum (Σ) for the three illustrated values of 234, 243, and 237 totals 714, and is shown adjacent pixel p1 of the last line-vertical-scan 20N in FIG. 2b. Similarly, the sum for pixel p2 is 241+245+240= 726. All of the other pixels are similarly summed. Processor 22 then turns the sum value for each pixel into an average by dividing the sum value by the number of vertical line scans. In FIG. 2b, the sums are those of only three vertical line scans, so the averages A are for pixels p1 and p2 are illustrated as the values 714 and 726, respectively, divided by three, giving averaged values 238 and 242, respectively. The average values A for each of the pixels p1, p2, p3, ..., p2N are stored in a memory associated with processor 22 of FIG. 1, and used to perform corrections of the signal values during normal operation with objects containing information to be extracted.

Once all the average values A are generated for each of the pixels p1 through p2N, and the values are stored, processor 22 of FIG. 1 determines the factor which is required to raise each of the average values A to a common ideal value, such as the maximum average value determined previously. In this context, the word "factor" is not necessarily meant in the technical sense of the result of division. The average value A for pixel p1 taken over a complete object is 238 in the example of FIG. 2b; it would not be expected that any non-calibration object would have a higher average value. Correction can be accomplished by weighting (multiplication by a factor) of the information-bearing signal, or by addition thereto of a constant or factor. Consequently, when an object containing information is processed after the completion of the calibration, the moment-to-moment signal level or pixel signal produced at the output of camera 12 of FIG. 1 is normalized or corrected in such a manner that a signal level representing the average value for that pixel position is raised to the ideal level which can be represented, or to some other selected value less than the maximum. If the correction is performed by multiplication, the appropriate factor $V_{ideal}/A$ would be used, where $V_{ideal}$ is the ideal representable value, and A is the average for that pixel over the calibration object. For example, given an ideal level of 251, the multiplicative factor in the case of an eight-bit system for pixels p1 and p2 of FIG. 2b would be 251/238 and 251/242, respectively. For the case of an additive constant, the constant to be added to the information signal would simply be the difference between the average value and the maximum possible (or other selected) value. In the case of an eight-bit signal and the values of the example of FIG. 2b, the additive constants for column 201 would be thirteen for p1, and nine for p2.

Figure 3A:
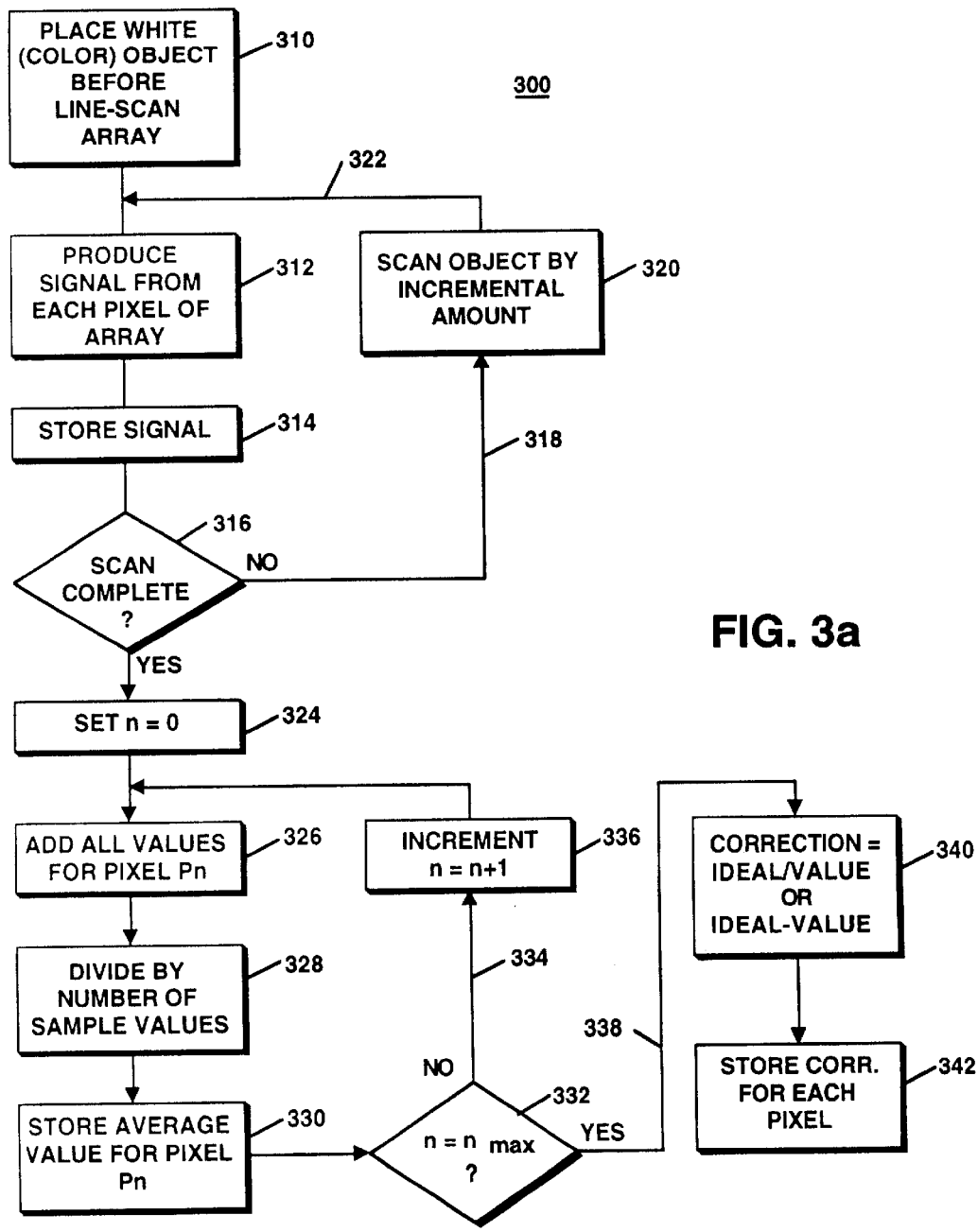
FIG. 3a is a simplified flow chart or diagram illustrating the process for normalization or set-up of the correction system according to an aspect of the invention.

In FIG. 3a, the process or normalization or set-up 300 of the correction system begins with a block 310, representing the placement of an all-white calibration object before the line array of sensors. Block 312 represents the production of signal from each pixel of the line array, and block 314 represents storage of those signals. In the case of a 4096-pixel array, this step represents the storage of 4096 individual signal values. Decision block 316 represents a determination of completion of the scan across the object. If the scan has not been completed, the logic flows by way of a logic path 318 to a block 320, which represents incremental motion or scanning of the object relative to the line array. The logic or process proceeds around the loop including blocks 312, 314, 316, and 320, until, eventually, the scan is completed, and a value has been stored for each pixel of the calibration object. Completion of the scan may be determined, in the context of a moving mailpiece, by a flag generated by a light beam extending across the region in space where an object, if present, would be imaged. The absence of a portion of an opaque object in this region would allow the light beam to traverse the region, and produce the desired flag. When the scan is complete, the logic flows from the NO output of decision block 316 of FIG. 3a to a block 324.

Block 324 of FIG. 3a represents the beginning of processing of the signals stored in conjunction with the step represented by block 314, to produce the desired correction signals. In block 324, an index representing the pixel whose stored signals are to be processed is set to zero. Thus, during a first pass, with index set to zero, the stored values for the first pixel, pixel $p_0$, are considered. Block 326 represents the adding together of the values of all the signals produced during the scan by pixel $p_0$, as described in conjunction with FIG. 2b. Block 328 represents division of the summed signal by the number of sample values which pixel $p_0$ produced during the scan of the white object, to thereby produce an average value of signal. The average value for the current pixel is stored, as represented by block 330. From block 330, the logic flows to a decision block 332, which decides when the calculations have been completed by examining the current index n to determine if it equals $n_{max}$, the maximum number of pixels, which in the exemplary embodiment is 4096 ($n_{max}$=4095). So long as n is less than $n_{max}$, decision block 332 routes the logic from its NO output to a block 336, which increments the value of n to n+1. The logic then returns to block 326, for addition together of the values of all signals produced during the scan of the object by current pixel $p_n$. Eventually, all of the average values for pixel 0 to 4095 will have been calculated, and the logic will then leave decision block 332 by the YES output, and flow to a block 340. Block 340 represents the calculation of the correction value. In the case of a multiplicative correction factor, the correction for each pixel could be the maximum average value determined for pixel positions 0–4095, say 251, divided by the value represented by each average signal (A) as stored in conjunction with block 330. In the case of an eight-bit signal, the multiplicative correction factor is 251/avg or 251/A. In the case of an additive correction factor, the correction factor could be the appropriate maximum value, minus the average value, or for an eight-bit signal, 251-avg. The calculated correction factors are stored, as represented by block 342.

Figure 3B:
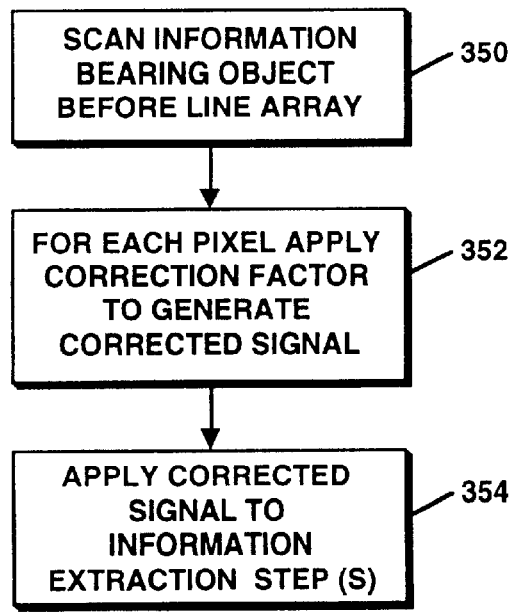
FIG. 3b represents the logic for application of correction to the signals in normal operation.

FIG. 3b represents the flow of normal operation, in which the object 30 being scanned will have information which must be extracted. The process of FIG. 3b begins with a block 350, which represents the scanning of an information-bearing object before the line array. This is equivalent to the scanning of a white envelope, with an address inscribed thereon, before the line array. The correction factor stored in conjunction with block 342 of FIG. 3a is applied to the current value read by the corresponding pixel of the line array, to thereby generate the desired corrected value, as suggested by block 352. The corrected value for each pixel is sent on for further processing, as suggested by block 354.

It should be noted that, in a preferred embodiment of the invention, the process steps represented by block 352 of FIG. 3b are not performed directly by processor 22 of FIG. 1, but are performed instead by a firmware or hardware processor, such as a programmable gate array, which is loaded with the correction factors for each pixel after the normalization or correction factor determination steps represented by FIG. 3a, which are performed by processor 22.

The use of a firmware or hardware processor for doing the normal-operation correction of the signals allows operation at the highest possible speed. The application of correction factors as described above has been demonstrated to provide an enhanced image representation, with reduced horizontal banding.

The aspect of the invention described in conjunction with FIGS. 1, 2a, and 2b has the effect of urging the signal level toward the maximum possible value. In the case of normal positive images, the maximum possible value may represent a white level. Thus, the raw values of the signal from the imager, when corrected, are closer to white level (or black level, in the case of a negative image) than before. This may have a tendency to "wash out," or reduce the contrast of, light (black) portions of the information. The reduced contrast, in turn, may adversely affect data extraction in later processing steps. According to the aspect of the invention described in conjunction with FIG. 4, According to another aspect of the invention, the correction described above is applied only if the raw or uncorrected signal level is above or below a given threshold value of the raw or uncorrected signal, and is not applied when the raw signal is below or above the threshold, respectively, in order to avoid degrading information-carrying edges of the images.

Figure 4:
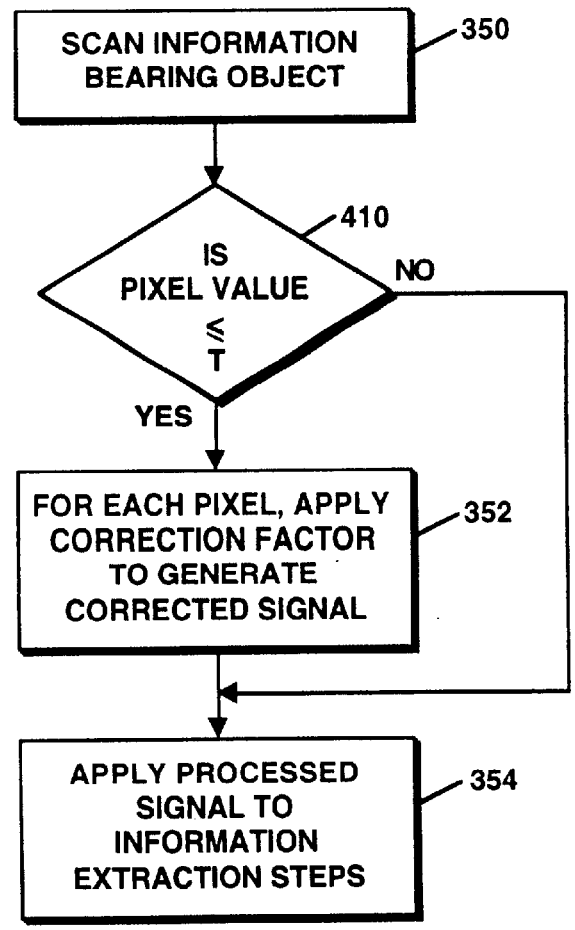
FIG. 4 is a simplified flow chart or diagram illustrating the logic for application of correction to those signals, in normal operation, lying on one side of a threshold value, and not to signals lying on the other side of the threshold.

FIG. 4 represents the processing when a threshold is applied in conjunction with this aspect of the invention for applications where dark content is of important to subsequent image processing. In FIG. 4, block 350 is identical to block 350 of FIG. 3b. From block 350, the logic flows to a further decision block 410, which determines if the value of the signal sensed by each pixel is greater or less than a threshold value T, which in this context is taken to mean that the signal value represents a value closer to white than the threshold value. If smaller values represent white and larger values black then the thresholding represented by block 410 is reversed. If the currently sensed signal value from a pixel is lighter than the threshold value T, the logic leaves decision block 410 by the YES output, and flows to blocks similar to blocks 352 and 354 of FIG. 3b. If the sensed signal level from a pixel is darker than threshold T, the logic leaves decision block 410 by the NO output, and flows directly to block 354 for storage, bypassing block 352 in which the correction factor is applied. Thus, when the current signal from a pixel is more dark that threshold T, the signal is stored, as suggested by block 354, without application of the correction factor.

In the case of a signal in which an all-ones digital signal represents a white level, a threshold value may be selected to be at any value or "location." In the range of values of 0 to 255 as described in conjunction with FIG. 3a, where 0 represents black and 255 white, a suitable, threshold value has been found to be approximately 30.

Figure 5:
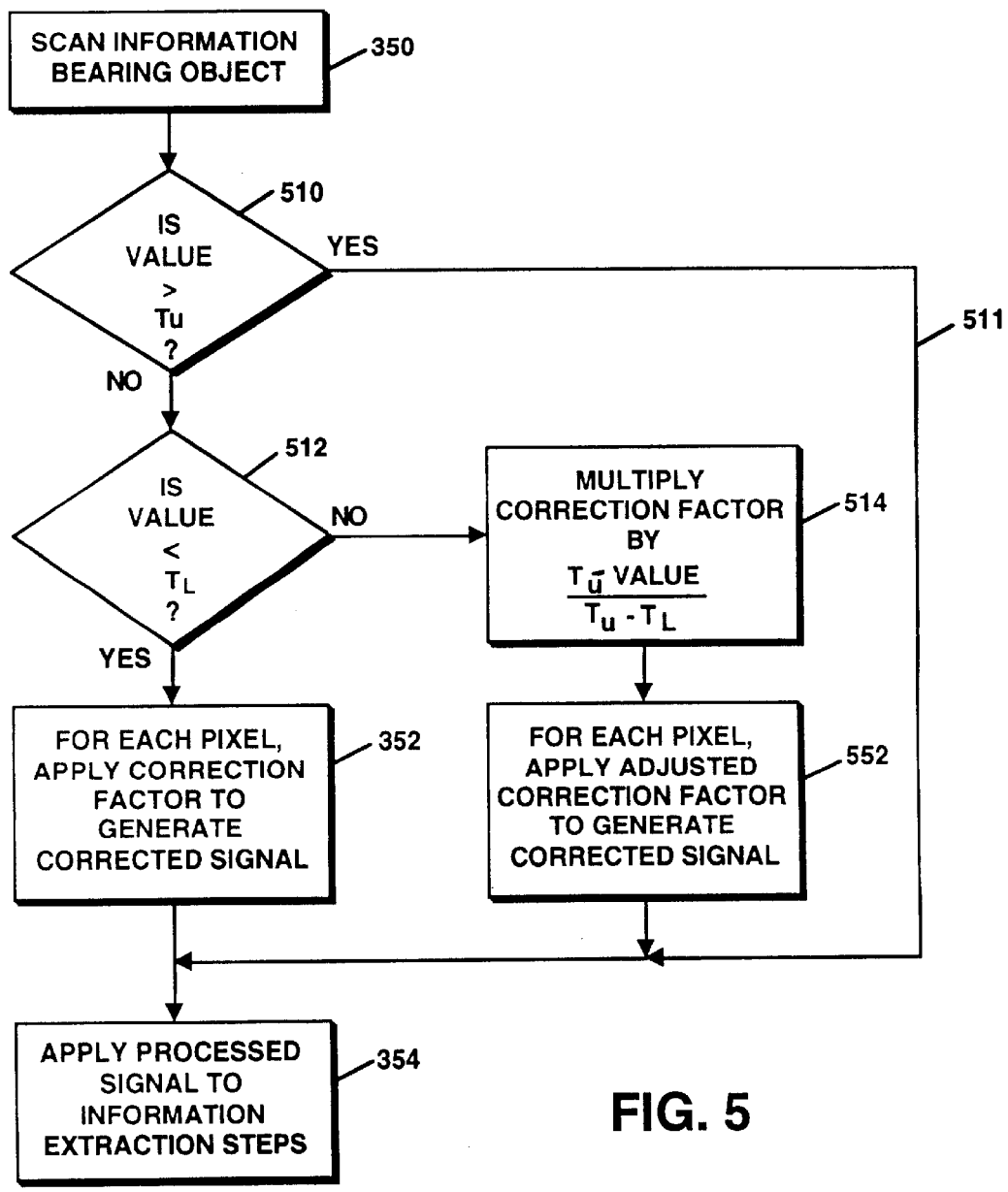
FIG. 5 is a simplified flow chart or diagram illustrating the logic for application of correction to those signals lying on a first side of a first threshold, not to signals on the second side of a second threshold, and in a variable amount to those signals lying between the first and second thresholds.

According to another aspect of the invention, two thresholds are provided, and the correction is provided for raw signals above the upper threshold, is not provided for raw signals below the lower threshold, and is graded or proportioned in the raw signal range lying between thresholds. The logic of FIG. 5 illustrates the use of a graded correction factor. In FIG. 5, the processing begins, as in the case of FIG. 3b, with a block 350, representing the scanning of the information-bearing object, to generate signals from each pixel of the line array. The logic flows to a decision block 510, which compares the value of the signal from each pixel with an upper threshold value $T_U$. If the value of the pixel value lies above the upper threshold, the logic leaves decision block 510 by the NO block and proceeds by a logic path 511 to block 354, representing the sending of the processed signal to the next processing step, without application of any correction factor. If the value of a pixel is less than the value of the upper threshold $T_U$, the logic leaves decision block 510 and proceeds to a further decision block 512. Decision block 512 represents comparison of the pixel value with a lower threshold value $T_L$. If the pixel value is below the lower threshold $T_L$, the logic leaves decision block 512 and proceeds to a block 352, which applies the correction factor, just as in FIG. 3b. In the region between the upper threshold $T_U$ and lower threshold $T_L$, the correction factor is proportioned. The proportioning is selected to progressively increase the amount of correction which is applied to the pixel value as the value approaches the upper or lower threshold. This is accomplished by routing the logic to a block 514 from the NO output of decision block 512. This routing occurs when the signal value lies between $T_U$ and $T_L$. Block 514 proportions the correction signal by multiplication of the memorized correction factor by $$T_U\text{-value}/(T_U-T_L) \qquad 1$$

The resulting adjusted correction factor will be at close to 100% of the unadjusted correction factor when the raw pixel value is near lower threshold $T_L$, and close to zero when the raw pixel value is near $T_U$, and will be proportioned in the region between $T_U$ and $T_L$.

It should be understood that the invention applies to situations of normal images, as in photographic positives in which the ground or background is white, and also applies to inverted or negative images, as in photographic negatives, in which the ground or background is black.

Other embodiments of the invention will be apparent to those skilled in the art. For example, the term "sensitivity" as applied to a pixel includes such factors as efficiency. While the description of the invention as described above speaks in terms of "grey scale" and the use of a white object for performing the normalization, those skilled in the art recognize that the same concept applies to a scale of any particular color, and to an object having a uniform corresponding coloration. While the digital signals have been described as being in parallel form, serial digital form can be used at a higher clock rate. When register set 16 of FIG. 1 includes K registers rather than the two as shown, there must be a corresponding number K in the set 18 of amplifiers and in the set 20 of ADCS. While the object 30 of FIG. 1 has been illustrated and described as moving relative to the camera or imaging system in order to provide an area scan, those skilled in the art know that this is simply relative motion, and that the camera can move relative to the object, or both can be in motion, so long as the desired difference in motion is present. While an eight-bit digital signal or representation has been described in conjunction with all of the examples, those skilled in the art will recognize that the invention applies to any other digital representations, such as three-, nine-, or fifteen-bit representations. While the line-scan array 14 of FIG. 1 has been described as "vertical," those skilled in the art will recognize that this refers merely to the illustration, and that the actual orientation of the line array is not meaningful to the invention.

Thus, an imaging system (10) or camera according to an aspect of the invention includes a discrete-pixel line array (12), including a array (14) of light-sensitive pixel sensors, for absorbing light during an interval and producing analog electrical signals in response to the light, and for transferring the signals to an output port (16ao, 16bo). The resulting signals are representative of an image (of object 30). The imaging system (10) also includes an illuminating arrangement (40) for illuminating an object (30) to be imaged, and for causing illumination of the object to excite the array. This arrangement may include a light source (30) directed toward the object (30), and an optical system (13) associated with the imager (11) for casting or forming an image of a portion (a vertical stripe such as 201 of FIG. 2a) of the object (30) onto the line array (14). The image resulting from the image-representative signals may be subject to distortion arising from at least one of (a) pixel-to-pixel variations in sensitivity of the array, (b) image illumination variations, (c) channel (16) errors in multichannel arrays, and (d) other sources, which result in distortion of an image generated from the signals. An arrangement (32) is provided for scanning (34) the object (30) relative to the array (14), so as to produce a sequence of raw or uncorrected signals associated with each pixel of the array across the scanned object. The scanning (34) provides relative motion, so either the line array (14), the object (30), or both may be moved; it should also be possible to provide the relative motion of the image across the line array (14) without motion of either the object or the imager, by motion of the image-forming or lens arrangement. A color-scale correction arrangement (22) is coupled to the array, for receiving the raw or uncorrected signals, and for correcting the signal representing each uncorrected pixel by a correction factor. In the case of a monochrome or black-and-white line array, the color-scale correction is a grey-scale correction. The correction factor is established or determined by a procedure including the steps of (a) with a particular color object (a white object in the case of a monochrome line array) before the array, averaging (326, 328, 330) the values of the uncorrected signal for each of the pixels of the array over at least a portion of the scanned white object, to thereby produce averaged raw or uncorrected signals for each pixel of the line array, (b) for each of the pixels of the line array, determining an ideal averaged signal value produced by an ideal pixel of an ideal imager. The correction factor which is applied to the signal from each pixel of the line array during normal operation is that factor required to bring the averaged uncorrected signal value to the ideal uncorrected signal value. In a first type of correction, the correction factor is multiplied by the uncorrected signal from the pixel. In a second type of correction, the correction factor is added to the uncorrected signal from the pixel.

In a particularly advantageous embodiment of the invention, the imaging system further includes a threshold arrangement ($T_U$, $T_L$) coupled to the color-scale correction arrangement or grey-scale correction arrangement, for enabling the color-scale correction arrangement when the uncorrected signal value for a particular pixel represents a color scale value or grey-scale value having a value lying on a first side of a threshold value, where the threshold value lies between black level and the ideal averaged uncorrected signal value for the particular color. Thus, in one embodiment, the correction of the signal from a pixel is not performed for that pixel if the signal level at the moment in question represents a value darker than the threshold value, whereas the correction is performed (by multiplication by, or addition of, the correction factor) if the signal value represents a grey or color value on the lighter black side of the threshold.

A method according to another aspect of the invention, for correcting the signals produced by each pixel of a line-scan imager array, includes the set-up steps and normal-operation steps. The set-up steps include the step of scanning a white object before a line-scan array, to thereby produce, for each pixel of the array, a sequence of raw signals representing a portion of the object. The set-up further includes the step of averaging the values of the sequence of raw signals of each of the pixels across at least a portion of the object, to thereby produce an average value for each of the pixels, followed by determining, for each the pixel of the line array, one of (a) a multiplicative and (b) an additive correction factor which, when applied to the average value of the signal, results in a predetermined ideal value of the signal. Following the set-up steps, the method includes the normal-operation steps of, scanning an information-carrying object before the line-scan array, to thereby produce raw signals from each pixel of the line-scan array, and correcting the raw signals by one of (a) multiplying the raw signal from or for each pixel by the multiplicative correction factor and (b) adding to the raw signal from each pixel the additive correction factor, to thereby produce corrected signals for each of the pixels of the line-scan array. Following correction of the normal-operation signals, the corrected signals representing the scanned object are processed by methods, not a part of the invention, to extract information therefrom, as by optical character recognition processes.

What is claimed is:

1. An imaging system, comprising:
 a line discrete-pixel array, including an array of light-sensitive pixel sensors, for absorbing light during an interval and producing analog electrical signals in response to said light, and for transferring said signals to an output port, said signals being representative of an image;
 means for illuminating an object to be imaged, and for causing illumination of said object to excite said array, the image resulting from said image-representative signals being subject to distortion arising from at least one of (a) pixel-to-pixel variations in sensitivity of said array, (b) image illumination variations, (c) channel errors in multichannel arrays, and (d) other sources, which result in distortion of an image generated from said signals;
 means for scanning said object relative to said array, so as to produce a sequence of uncorrected signals associated with each pixel of said array across said scanned object;
 color-scale correction means coupled to said array, for receiving said uncorrected signals, and for correcting the signal representing each uncorrected pixel by a correction factor, said correction factor being established by,
 (a) with a particular color object before said array, averaging the value of said uncorrected signal for each of said pixels of said array over at least a portion of said scanned object, to thereby produce averaged uncorrected signals for each pixel,
 (b) for each of said pixels of said array, determining an ideal averaged uncorrected signal value produced by an ideal pixel of an ideal imager, said correction factor being the factor required to bring the averaged uncorrected signal value to said ideal signal value; and,
 threshold means coupled to said color-scale correction means, for enabling said color-scale correction means when the uncorrected signal value for a particular pixel represents a color scale value having a value lying on a first side of a threshold value lying between said ideal averaged uncorrected signal value for a particular color and said black level, and for reducing the correction provided by said color-scale correction means when the uncorrected signal value for a particular pixel represents a color scale value lying on a second side of said threshold value.

2. An imaging system, comprising:

a line discrete-pixel array, including an array of light-sensitive pixel sensors, for absorbing light during an interval and producing analog electrical signals in response to said light, and for transferring said signals to an output port, said signals being representative of an image;

a light source for illuminating an object to be imaged, and for causing illumination of said object to be imaged, and for causing illumination of said object to excite said array, the immage resulting from said image—representative signals being subject to distortion arising from at least one (a) pixel-to-pixel variations in sensitivity of said array, (b) image illumination variations, (c) channel errors in multichannel arrays, and (d) other sources, which result in distortion of an image generated from said signals;

a scanner for scanning at least a portion of said object relative to said array, so as to produce a sequence of uncorrected signals associated with each pixel of said array across the scanned object;

a grey-scale corrector coupled to said array, for receiving said uncorrected signals, and for correcting the signal representing each uncorrected pixel by a correction factor, said correction factor being established by, (a) with a white object before said array, averaging the values of said uncorrected signal for each of said pixels of said array over at least a portion of said scanned object, to thereby produce averaged uncorrected signals for each pixel, (b) for each of said pixels of said array, determining an ideal averaged uncorrected signal value produced by an ideal pixel of an ideal imager, said correction factor being the factor required to bring the averaged uncorrected signal value to said ideal signal value; and a threshold control arrangement coupled to said grey-scale corrector, for enabling said grey-scale corrector during those times in which the uncorrected signal value for a particular pixel represents a grey-scale value having a value lying on a first side of a threshold value lying between said ideal averaged uncorrected signal value for a white object and black level, and for reducing the correction by a non-zero reduction provided by said grey-scale corrector during those times in which the uncorrected signal value has a value on a second side of said threshold value.

3. An imaging system according to claim 2, wherein said threshold control arrangement applies no correction during those times in which the uncorrected signal value has a value on a second side of a second threshold, and during those times in which said uncorrected signal value lies between said first and second thresholds, apportions said correction in an amount dependent upon the proximity of said uncorrected signal value to said first and second thresholds.

4. A method for correcting the signals produced by a pixel of a line-scan imager array, said method comprising the steps of:

in a set-up mode of operation, scanning a white object before a line-scan array, to thereby produce, for each pixel of said array, a sequence of raw signals representing a portion of said object;

in said set-up mode of operation, averaging the values of said sequence of raw signals of each of said pixels across at least a portion of said object, to thereby produce an average value for each of said pixels;

in said set-up mode of operation, determining, for each said pixel of said line array, one of (a) a multiplicative and (b) an additive correction factor which, when applied to said average value of said signal, results in a predetermined ideal value of said signal;

in normal operation, scanning an object before said line-scan array, to thereby produce raw signals from each pixel of said line-scan array;

in said normal operation, correcting those of said raw signals which lie on a first side of a threshold by one of (a) multiplying the raw signal from each pixel by said multiplicative correction factor and (b) adding to the raw signal from each pixel said additive correction factor;

in said normal operation, correcting those of said raw signals which lie on a second side of said threshold by one of (a) multiplying the raw signal from each pixel by said multiplicative correction factor times a non-zero reduction factor and (b) adding to the raw signal from each pixel said additive correction factor times another non-zero reduction factor; and in said normal operation, processing said corrected signals to extract information therefrom.

5. A method for correcting the signals produced by a pixel of a line-scan imager array, said method comprising the steps of:

in a set-up mode of operation, scanning a white object before a line-scan array, to thereby produce, for each pixel of said array, a sequence of raw signals representing a portion of said object;

in said set-up mode of operation, averaging the values of said sequence of raw signals of each of said pixels across at least a portion of said object, to thereby produce an average value for each of said pixels;

in said set-up mode of operation, determining, for each said pixel of said line array, one of (a) a multiplicative and (b) an additive correction factor which, when applied to said average value of said signal, results in a predetermined ideal value of said signal;

in normal operation, scanning an object before said line-scan array, to thereby produce raw signals from each pixel of said line-scan array, each of said raw signals having a corresponding signal value;

in said normal operation, correcting those of said raw signals having a corresponding signal value lying on a first side of a first threshold and on a first side of a second threshold, by one of (a) multiplying the raw signal from each pixel by said multiplicative correction factor times a reduction factor and (b) adding to the raw signal from each pixel said additive correction factor times another reduction factor;

in said normal operation, correcting those of said raw signals having a corresponding signal value which lies on a second side of said second threshold by one of (a) multiplying the raw signal from each pixel by said multiplicative correction factor and (b) adding to the raw signal from each pixel said additive correction factor;

in said normal operation, not applying a correction to those of said raw signals having a corresponding signal value which lies on a second side of said first threshold; and, in said normal operation, processing said corrected signals to extract information therefrom.

* * * * *

UNITED STATES PATENT AND TRADEMARK OFFICE
CERTIFICATE OF CORRECTION

PATENT NO. : 6,753,914 B1
APPLICATION NO. : 09/370007
DATED : June 22, 2004
INVENTOR(S) : Dane Roy Frost Page 1 of 1

It is certified that error appears in the above-identified patent and that said Letters Patent is hereby corrected as shown below:

Claim 2, lines 9-10 (column 13, lines 9-10), "to be imaged, and for causing illumination of said object" should be deleted;

Claim 2, line 11 (column 13, line 11), "the immage" should read --the image--;

Claim 2, lines 12-13 (column 13, lines 12-13), "image --representative" should read --image representative--;

Claim 4, line 6 (column 13, line 62), "said array" should read --said line-scan array--;

Claim 4, line 13 (column 14, line 2), "said line array" should read --said line-scan array--;

Claim 5, line 6 (column 14, line 29), "said array" should read --said line-scan array--; and Claim 5, line 13 (column 14, line 36), "said line array" should read --said line-scan array--.

Signed and Sealed this

Fourth Day of September, 2007

JON W. DUDAS
*Director of the United States Patent and Trademark Office*